(12) United States Patent
Eisenstock et al.

(10) Patent No.: US 9,340,374 B2
(45) Date of Patent: May 17, 2016

(54) APPARATUS AND METHODS FOR PRODUCING A CERAMIC GREEN BODY

(71) Applicant: CORNING INCORPORATED, Corning, NY (US)

(72) Inventors: Gregory Eisenstock, Rochester, NY (US); Ryan Daniel Ratchford, Pittsburgh, PA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/755,017

(22) Filed: Jun. 30, 2015

(65) Prior Publication Data

US 2015/0298918 A1 Oct. 22, 2015

Related U.S. Application Data

(63) Continuation of application No. 13/227,944, filed on Sep. 8, 2011, now Pat. No. 9,073,250.

(51) Int. Cl.

| | |
|---|---|
| *B65G 53/00* | (2006.01) |
| *B65G 51/03* | (2006.01) |
| *B65G 49/08* | (2006.01) |
| *B65G 53/02* | (2006.01) |
| *B29C 47/34* | (2006.01) |
| *B28B 3/22* | (2006.01) |
| *B28B 13/04* | (2006.01) |
| *B29C 47/00* | (2006.01) |
| *B29C 47/94* | (2006.01) |
| *B28B 3/20* | (2006.01) |

(52) U.S. Cl.
CPC ............... *B65G 51/03* (2013.01); *B28B 3/224* (2013.01); *B28B 13/04* (2013.01); *B29C 47/34* (2013.01); *B65G 49/08* (2013.01); *B65G 53/02* (2013.01); *B28B 2003/203* (2013.01); *B29C 47/0009* (2013.01); *B29C 47/94* (2013.01); *F26B 2210/02* (2013.01)

(58) Field of Classification Search
USPC ............... 406/88, 191; 414/676; 384/120
See application file for complete search history.

(56) References Cited

U.S. PATENT DOCUMENTS

| | | | | |
|---|---|---|---|---|
| 3,734,271 | A | * 5/1973 | Dolgolenko | B65G 15/60 198/811 |
| 3,804,567 | A | 4/1974 | Recknagel | |
| 3,873,163 | A | 3/1975 | Gladish | |
| 3,923,165 | A | * 12/1975 | Burdick | B60V 3/025 414/676 |
| 4,095,847 | A | * 6/1978 | Wear | B65G 53/14 406/85 |
| 4,365,915 | A | * 12/1982 | Neumann | F16C 29/02 406/88 |
| 4,705,583 | A | 11/1987 | Zuber | |
| 4,810,458 | A | 3/1989 | Oshima et al. | |

(Continued)

FOREIGN PATENT DOCUMENTS

EP 0525312 3/1993

*Primary Examiner* — Joseph Dillon, Jr.
(74) *Attorney, Agent, or Firm* — Joseph M. Homa

(57) ABSTRACT

An apparatus for producing a green body of ceramic-forming material can comprise a support device including at least one air bearing including a support surface with a plurality of apertures. In one example, the support surface is configured to circumscribe greater than 180° of a support area for the green body. In another example, the plurality of apertures include at least a quantity of apertures oriented with a fluid emitting axis extending at an oblique angle with respect to an extrusion axis. In still another example, the air bearing is adjustable. Methods for producing a green body also provide an air cushion between a support surface and the green body.

11 Claims, 7 Drawing Sheets

(56) References Cited

U.S. PATENT DOCUMENTS

| | | | |
|---|---|---|---|
| 5,057,001 A | 10/1991 | Eucker et al. | |
| 5,205,991 A | 4/1993 | Avery et al. | |
| 5,209,387 A | 5/1993 | Long et al. | |
| 5,227,105 A | 7/1993 | Eucker et al. | |
| 5,406,058 A | 4/1995 | Lipp | |
| 5,411,617 A * | 5/1995 | La Fiandra | B29D 11/00596 156/154 |
| 5,483,709 A * | 1/1996 | Foster | A61G 7/05769 180/125 |
| 5,957,077 A * | 9/1999 | Marolda | B63B 21/66 114/254 |
| 6,455,826 B1 | 9/2002 | Araya et al. | |
| 7,438,546 B2 | 10/2008 | Adriaansen et al. | |
| 7,481,606 B2 * | 1/2009 | Lyons | B65G 51/03 406/88 |
| 7,721,461 B2 | 5/2010 | Ishii et al. | |
| 8,073,098 B2 * | 12/2011 | Holzermer | F16C 32/0618 378/15 |
| 8,142,111 B2 * | 3/2012 | Kim | H01L 21/67784 406/86 |
| 8,376,663 B2 * | 2/2013 | Erceg | B65G 11/123 406/1 |
| 8,407,915 B2 | 4/2013 | George et al. | |
| 2003/0223827 A1 * | 12/2003 | Tilley | B65D 88/72 406/29 |
| 2006/0124010 A1 * | 6/2006 | Gelbart | B41C 1/1083 101/415.1 |
| 2007/0217782 A1 * | 9/2007 | McCutchen | G03B 17/00 396/427 |
| 2009/0110809 A1 * | 4/2009 | Buschbeck | B65H 23/24 427/74 |
| 2012/0213599 A1 * | 8/2012 | Inazawa | B65H 23/24 406/88 |
| 2015/0139573 A1 * | 5/2015 | Klusacek | F04D 29/057 384/114 |

\* cited by examiner

US 9,340,374 B2

APPARATUS AND METHODS FOR PRODUCING A CERAMIC GREEN BODY

CROSS-REFERENCE TO RELATED APPLICATIONS

This application is a continuation of U.S. patent application Ser. No. 13/227,944 filed on Sep. 8, 2011, the content of which is relied upon and incorporated herein by reference in its entirety, and the benefit of priority under 35 U.S.C. §120 is hereby claimed.

FIELD

The present disclosure relates generally to apparatus and methods for producing a green body of ceramic-forming material and, more particularly, to apparatus and methods for producing such a green body that is supported by an air cushion.

BACKGROUND

Apparatus and methods are known to produce green bodies of ceramic-forming material that are subsequently fired into a honeycomb ceramic body for various applications. For example, a batch of ceramic-forming material is known to be extruded from an extrusion die into a green body. Conventional apparatus are known to support the extruded green body with an air bearing.

SUMMARY

The following presents a simplified summary of the disclosure in order to provide a basic understanding of some example aspects described in the detailed description.

In one example aspect, an apparatus for producing a green body of ceramic-forming material comprises an extruding device including a die member. The extruding device is configured to extrude a batch of ceramic-forming material through the die member to form a green body. The apparatus further includes a support device including at least one air bearing including a support surface with a plurality of apertures. The support surface is configured to circumscribe greater than 180° of a support area for the green body. The apparatus further includes a fluid source configured to be placed in fluid communication with the plurality of apertures to create an air cushion between the support surface and the green body to support the green body within the support area.

In another example aspect, an apparatus for producing a green body of ceramic-forming material comprises an extruding device including a die member. The extruding device is configured to extrude a batch of ceramic-forming material through the die member along an extrusion axis to form a green body. A support device includes at least one adjustable air bearing including a support surface with a plurality of apertures. A radial position of the support surface relative to the extrusion axis is configured to be adjusted. A fluid source is configured to be placed in fluid communication with the plurality of apertures to create an air cushion between the support surface and the green body.

In still another example, a method of producing a green body comprises the steps of extruding a batch of ceramic-forming material into a green body along an extrusion axis and radially constricting a plurality of support segments of a plurality of adjustable air bearings such that each of the support segments follows an outer surface portion of the green body. The method further includes the step of emitting fluid from a plurality of apertures of each of the support segments to create an air cushion between the plurality of support segments and the outer surface portion of the green body.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION

Figure 1:
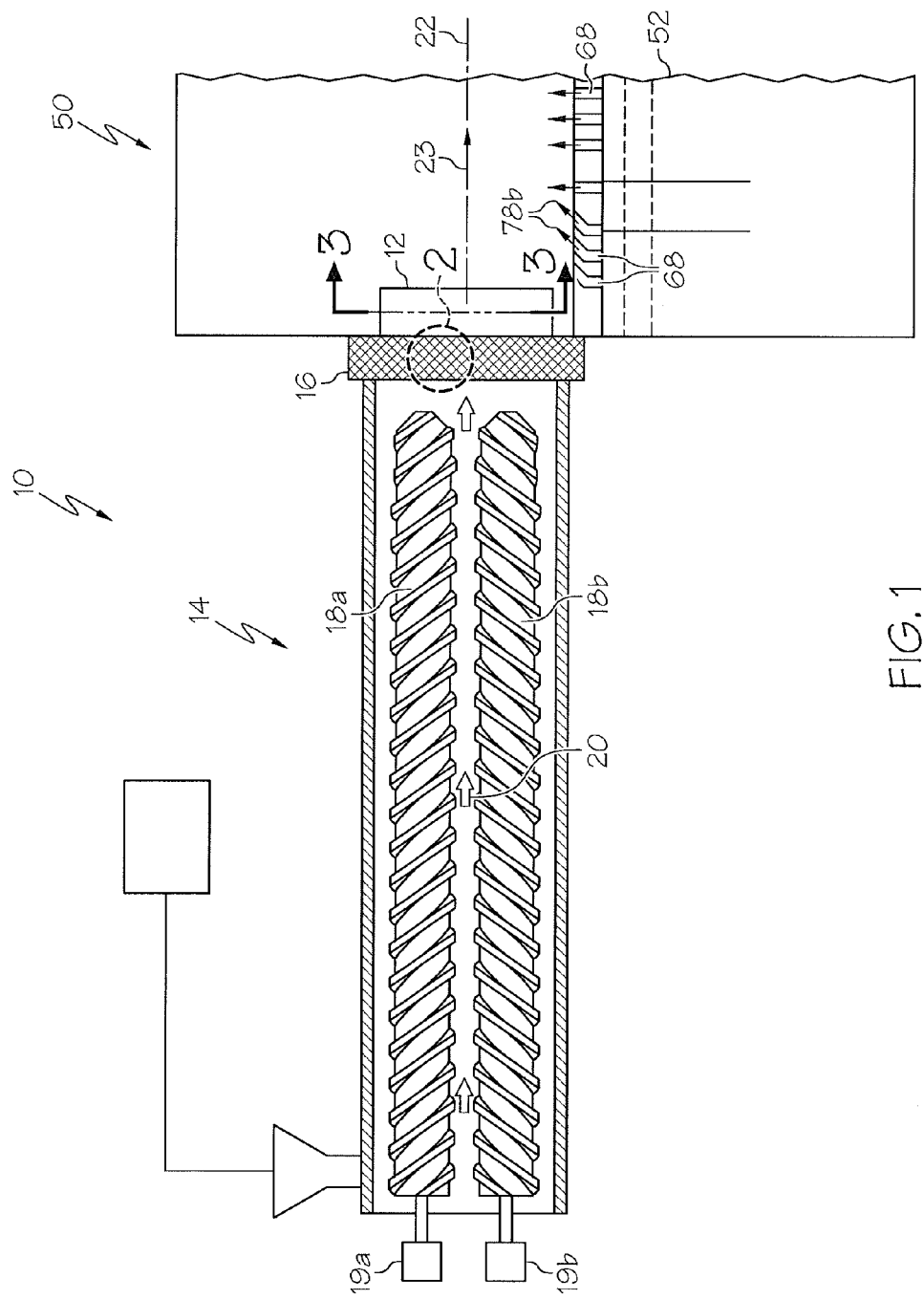
FIG. 1 is a schematic view of an extrusion apparatus and air bearing in accordance with aspects of the disclosure.

The present invention will now be described more fully hereinafter with reference to the accompanying drawings in which example embodiments of the claimed invention are shown. Whenever possible, the same reference numerals are used throughout the drawings to refer to the same or like parts. However, the claimed invention may be embodied in many different forms and should not be construed as limited to the embodiments set forth herein. These example embodiments are provided so that this disclosure will be both thorough and complete, and will fully convey the scope of the claimed invention to those skilled in the art.

As used in this specification, a "green body" is a structure or body of ceramic-forming material prior to firing. A "cellular structure," "honeycomb structure," or "body" includes any monolithic structure having inlet and outlet end faces, and having a matrix of walls defining a plurality of open-ended cells or passageways extending longitudinally and mutually parallel through the body between the inlet and outlet end faces of the body.

FIG. 1 illustrates a schematic view of an apparatus 10 for producing a green body 12 of ceramic-forming material. The apparatus 10 includes an extruding device 14 that is configured to extrude a batch of ceramic-forming material through the die member 16 to form a green body 12 of potentially unlimited length. Once the desired length is achieved, a cutter (not shown) can be used to sever the extruded green body 12 to provide a segmented green body 12.

The illustrated apparatus 10 depicts a twin-screw extruder including twin screws 18a, 18b configured to be rotated by respective motors 19a, 19b to mix and compress the batch of ceramic-forming material as it travels along a path 20 toward the die member 16. The extruding device 14 includes an extrusion axis 22 wherein the green body 12 can be extruded from the die member 16 along an extrusion direction 23 substantially parallel to the extrusion axis 22.

Figure 2:
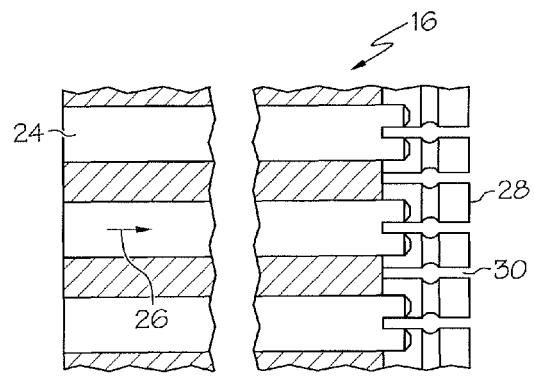
FIG. 2 is an enlarged partial sectional view of the die member of FIG. 1.
Figure 3:
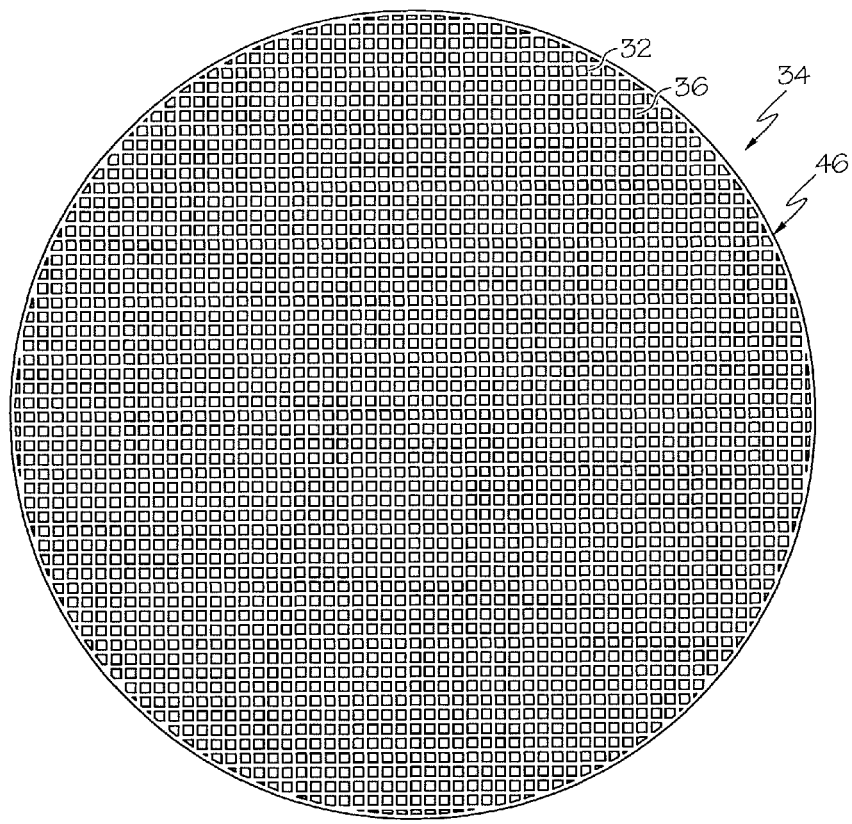
FIG. 3 is a sectional view of a green body along line 3-3 of FIG. 1.

FIG. 2 is an enlarged cross sectional view of an example die member 16 that may be used in accordance with aspects of the disclosure. As shown, the die member 16 includes feed holes 24 configured to feed batch material in direction 26, along the path 20, toward a plurality of die pins 28. The die pins 28 are spaced apart from one another to define slots 30 designed to form the walls 32 of the honeycomb structure 34 (best seen in FIG. 3) as the batch material is drawn into the extruded green body 12. The die pins 28 shown in FIG. 2 can have a square shape to define square-shaped channels 36 (best seen in FIG. 3) although other die pin 28 configurations (e.g., hexagonal, octagonal, etc.) can be selected depending on the desired channel configuration.

Returning to FIG. 1, the apparatus 10 includes a support device 50 configured to support the extruded green body 12 as the green body 12 is extruded from the die member 16. The support device 50 can include at least one air bearing 52 that may be used to produce an air cushion as discussed more fully below.

Figure 4:
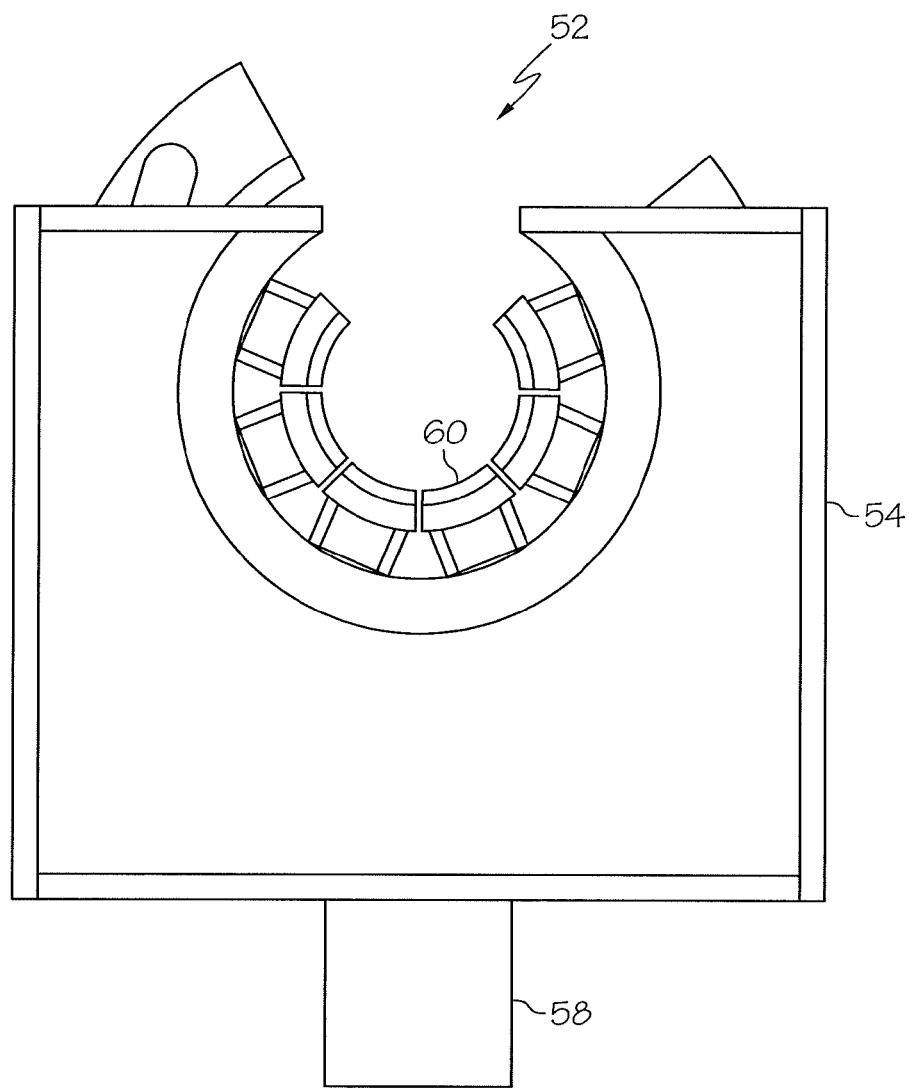
FIG. 4 illustrates an example air bearing along line 4-4 of FIG. 12.

FIG. 4 illustrates an end view of the air bearing 52. As shown, the air bearing 52 can include a box frame 54 which defines at least one interior air chamber 56 (best seen in FIG. 5). If provided, the box frame 54 can include at least one fluid inlet 58 allowing fluid communication between a fluid source 70 (best seen in FIG. 12) external to the box frame 54 and the interior air chamber 56. In one example, the interior air chamber 56 can be secured so that little or no ambient atmosphere can enter into the interior air chamber 56 during operation of the apparatus 10. The box frame 54 can be cube-shaped and constructed of metal, although other shapes and materials are contemplated.

Figure 5:
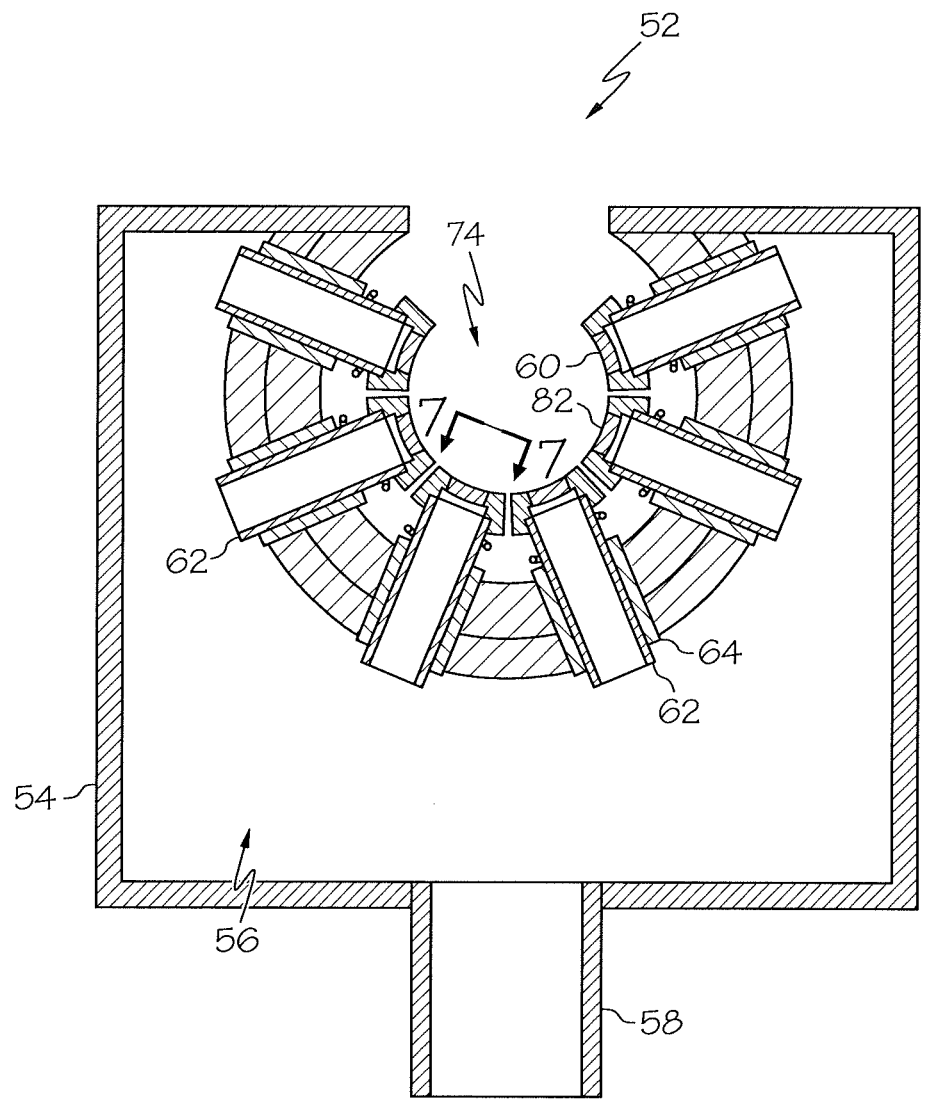
FIG. 5 is a sectional view of an example air bearing along line 5-5 of FIG. 12.

Turning to FIG. 5, the air bearing 52 may include a support surface 60. In one example, the support surface 60 is constructed of a polymer, however other materials are contemplated. Material choice for the support surface 60 can be made on the basis of a low coefficient of friction between the support surface 60 and the extruded green body 12 to help accommodate relative movement upon the occurrence of any contact between the support surface 60 and the green body 12. The support surface 60 includes a plurality of apertures 68 (best seen in FIG. 7) through which a pressurized fluid can pass. In one example, the apertures 68 are in fluid communication with the interior air chamber 56 by way of a hollow support 62.

In one example, the support surface 60 can be rigidly connected to a hollow support 62. The hollow support 62 can be slidingly engaged with bushing 64 which is located in an aperture defined by the box frame 54. Aspects of the bushing 64 material selection can include a low coefficient of friction and self-lubricating features. In one example, the bushing 64 material is polytetrafluoroethylene (PTFE) such as Rulon® J of Saint-Gobain Performance Plastics Corporation. In another example, other bushing 64 types may be included such as ball bushings, split bushings, press-fit bushings, etc.

Figure 12:
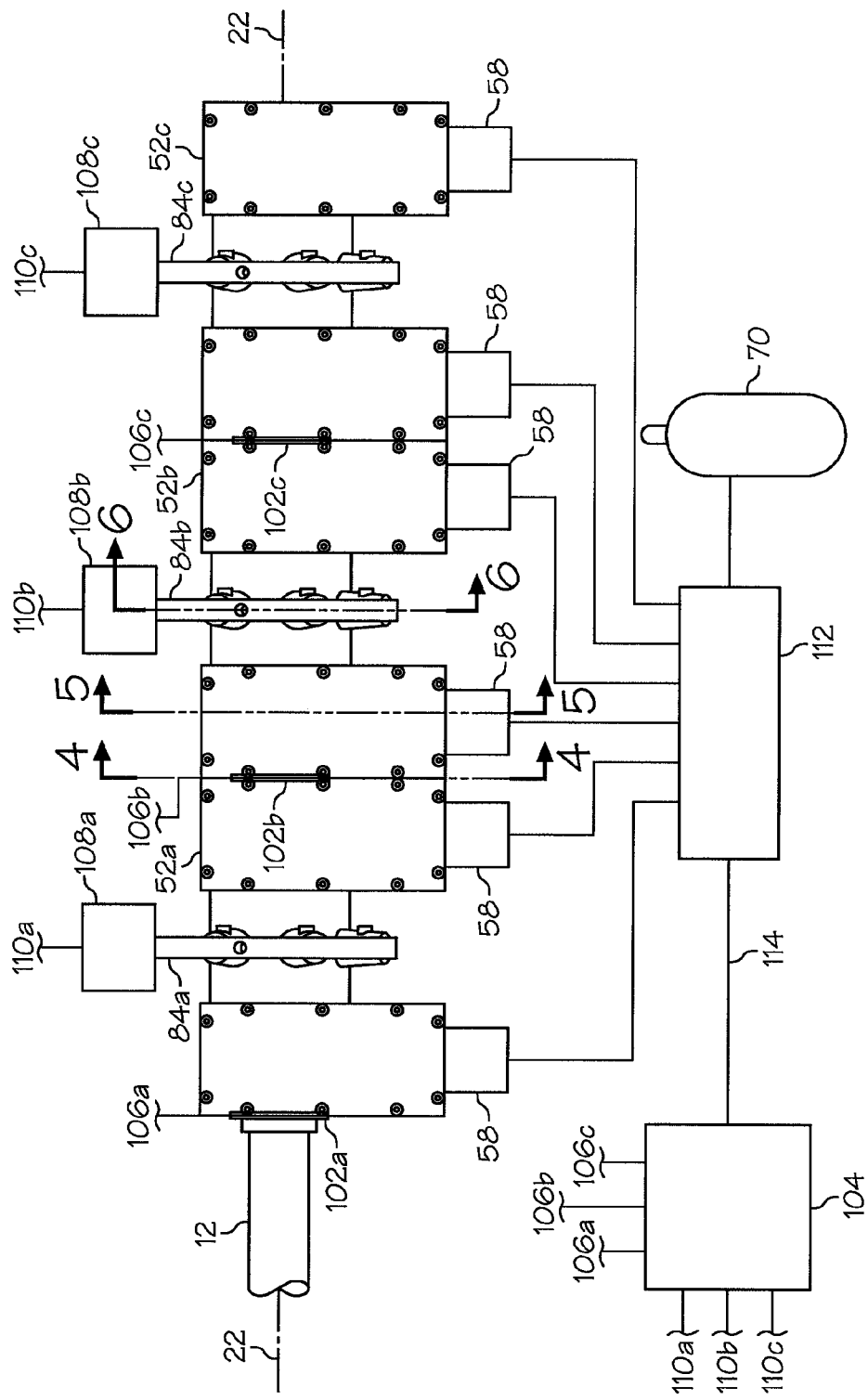
FIG. 12 is a schematic illustration of an example a system of air bearings used to support and move a green body produced by the extrusion apparatus of FIG. 1.

As schematically shown in FIG. 12, a fluid source 70 may be configured to be placed in fluid communication with the plurality of apertures 68 to create an air cushion between the support surface 60 and the green body 12 to support the green body 12 within a support area 74 (see FIG. 5). As shown, the fluid source 70 can be connected to the fluid inlet 58 located on the box frame 54 of the air bearing 52. The fluid can be liquid, vapor, or gas. Additionally, when the fluid is a gas, such as air, the gas can be humidified to enhance a characteristic of the production quality. In one example, the fluid source 70 provides pressurized air to the fluid inlet 58 which then pressurizes the interior air chamber 56. The pressurized air then flows through the hollow support 62 and the bushing 64 to reach the support surface 60 and exit the air bearing 52 through the apertures 68 in the support surface 60. The continuous supply of forced air is exerted through the apertures 68 to floatingly support the green body 12. In the example, low pressure air is sufficient to create an air cushion between the support surface 60 and the green body 12 so that the green body 12 may freely float in the support area 74 without necessarily contacting the support surface 60. However, various magnitudes of air pressure are contemplated depending, for example, on factors such as the gap between the support surface 60 and the green body 12, and the density of the green body 12.

Although not required in all examples, the support surface 60 may configured to circumscribe greater than 180° of the support area 74 for the green body 12. As such, the support area 74 may be designed to help more securely center and hold the green body 12 in place during the extruding and/or severing procedure. The side of the support surface 60 facing the support area 74 can be in the shape of a circular arc, although other non-circular shapes, such as ovals, are also contemplated. In one example, the support surface 60 is configured to provide a support area 74 consisting of a portion of a cylinder that is about 360°. In another example, the support surface 60 is configured to provide a support area 74 consisting of a portion of a cylinder that is less than about 315°. In another example, the support surface 60 circumscribes from about 215° to about 315° of the support area 74. In yet another example, the support surface 60 circumscribes from about 250° to about 280° of the support area 74. In still another example, the support surface 60 circumscribes about 265° of the support area 74.

One advantage of having a support area 74 circumscribing about 360° of the green body 12 includes developing better control of the movements of the green body 12 as it is supported by the air cushion. Another advantage of having a support area 74 circumscribing about 360° of the green body 12 includes a greater possibility of eliminating rotation of the green body 12 as it exits the extruding device 14. Still more advantages of having a support area 74 circumscribing about 360° of the green body 12 include more even drying of the green body 12 and a greater tendency to maintain the green body 12 in a circular cross-section with decreased tendency of slump within the green body 12. In one example of a support area 74 circumscribing about 360° of the green body 12, pressurized air enters the support area 74 through the apertures 68, forms an air cushion to support and perhaps transport the green body 12, and then exits the support area 74 through the gaps between the support surfaces 60. In another example, evacuation ports can function in the same way as the gaps between the support surfaces 60 to allow the pressurized air to exit the support area 74.

An advantage of having a support area 74 circumscribing less than 360° of the green body 12 includes a large space for pressurized air to exit the support area 74. As an example, if the support area 74 circumscribes about 315° of the green body 12, the pressurized air can leave the support area 74 through the space where no support surfaces 60 are located. Another advantage of having a support area 74 circumscribing less than 360° of the green body 12 includes greater ease in removing ceramic-forming material from the support area 74 other than through the normal operation of green body 12 motion along the extrusion axis 22. As an example, circumscribing less than 360° can accommodate unexpected process shut-down or inadvertent engagement of the green body 12 with the support segments 82 or other green bodies 12. Inadvertent engagement may break the green body 12 or render a green body 12 ineffective for further processing, requiring its removal from the support area 74. In these situations, the ceramic forming material can be removed from the support area 74 through the space where no support surfaces 60 are located.

Figure 7:
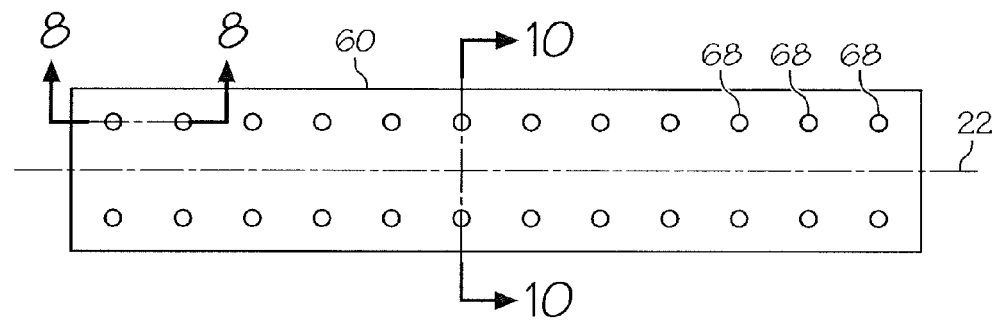
FIG. 7 is a schematic view of a support surface of an air bearing along line 7-7 of FIG. 5.

Turning to FIG. 7, an example support surface 60 is shown in plan view along line 7-7 of FIG. 5. Extrusion axis 22 is overlaid the support surface 60 for clarification of the orientation of the support surface 60. A plurality of apertures 68 are shown as an example of location and quantity, but many different locations and quantities of apertures 68 can be used. Exemplary cross-sections of the apertures 68 are shown parallel and perpendicular to the extrusion axis 22 in FIGS. 8 and 9 and FIGS. 10 and 11, respectively. In further examples, the apertures 68 may be spaced differently from one another and/or may have different sizes and/or shapes. As shown, the shape of the apertures 68 can be substantially circular although the apertures 68 can include other shapes.

Figure 8:
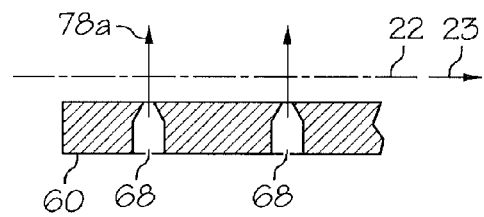
FIG. 8 is a sectional view of a support surface along line 8-8 of FIG. 7.

FIG. 8 is an example sectional view of a quantity of apertures 68 along line 8-8 of FIG. 7 that is parallel to the extrusion axis 22. As shown in FIG. 8, the quantity of the apertures 68 can be oriented with a fluid emitting axis 78a extending substantially perpendicular to the extrusion axis 22. The apertures 68 can have a fluid emitting axes 78a that are directed radially toward the center of the green body 12. This fluid emitting axis 78a orientation can be used for several objectives, the foremost being to counteract the effect of gravity upon the green body 12 so that the green body 12 freely floats above the support surface 60. Additional objectives include, but are not limited to, prevention of rotation of the green body 12 about the extrusion axis 22, and fostering a more even drying rate for the green body 12 to help prevent skin or surface related flaw or "fissures" which may degrade the performance or appearance of the finished product.

Figure 9:
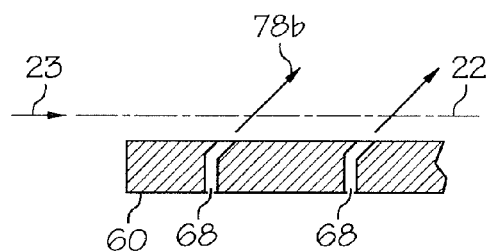
FIG. 9 is another example sectional view of a support surface along line 8-8 of FIG. 7.

FIG. 9 is another example sectional view along line 8-8 of FIG. 7, demonstrating that the quantity of the apertures 68 can be oriented with a fluid emitting axis 78b extending at an oblique angle with respect to the extrusion axis 22. This fluid emitting axis 78b orientation can be used to urge the green body 12 in the extrusion direction 23 parallel to the extrusion axis 22. As such, the fluid emitting from the apertures 68 can engage the green body 12 with one force component perpendicular to the green body 12 to help counterbalance the green body 12 with a cushion of air. At the same time, a force may be provided in the extrusion direction 23 to encourage movement (e.g., transport) of the green body 12 in the extrusion direction 23, thereby facilitating extrusion of the green body 12 from the die member 16.

Figure 10:
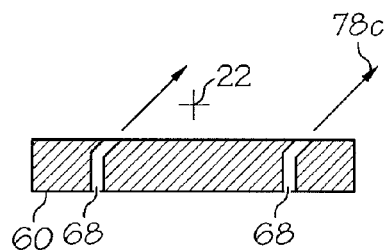
FIG. 10 is a sectional view of a support surface along line 10-10 of FIG. 7.

FIG. 10 is an example sectional view of a quantity of apertures 68 along line 10-10 of FIG. 7 that is perpendicular to the extrusion axis 22. As shown in FIG. 10, a quantity of the apertures 68 can be oriented with a fluid emitting axis 78c extending with a directional component that is transverse with respect to an extrusion direction 23 along an extrusion axis 22. This fluid emitting axis 78c orientation can be used bias the green body 12 to apply a rotational moment force to the green body 12 about the extrusion axis 22. In one example, a quantity of the fluid streams each apply a force component to an outer surface 46 of the green body 12 that is transverse with respect to the extrusion axis 22. A transverse force, such as a force tangent to the surface of the green body 12, may apply a moment arm about the extrusion axis 22. This force component is created by the pressurized fluid emitted from a quantity of the apertures 68 at a transverse angle with respect to the extrusion axis 22 can counteract a tendency of the green body 12 to rotate in the opposite direction as the green body 12 is extruded from the die member 16.

Figure 11:
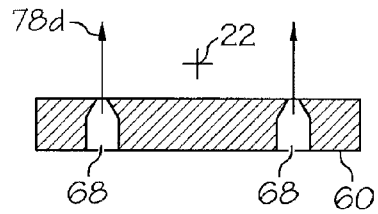
FIG. 11 is another example sectional view of a support surface along line 10-10 of FIG. 7.

Turning to FIG. 11, a quantity of the apertures 68 can be oriented with a fluid emitting axis 78d extending with a directional component that extends perpendicular to the extrusion axis 22 of the extruding device 14. The force of the apertures 68 in this orientation counteracts the effect of gravity upon the green body 12 so that the green body 12 freely floats by way of an air cushion above the support surface 60. It is to be understood that the orientation of the fluid emitting axis of the apertures 68 can include any combination of the described orientations to freely float, urge motion, or resist motion of the green body 12 on various support surfaces 60 or within the same support surface 60 as the green body 12 proceeds through the manufacturing process. As such, the delicate honeycomb arrangement of the green body 12 may be preserved as it is extruded from the die member 16.

Returning to FIG. 7, the apertures 68 at an end of the support surfaces 60 can be of one type of emitting axis while the apertures 68 in other portions of the support surface 60, e.g., the central portion of the support surface 60, are of a different emitting axis. This arrangement allows more functional control of the green body 12 as it enters and exits each individual air bearing 52. In one example, fluid emitting axis of the apertures 68 at one end of a support surface 60 can be tangential to the green body 12 while the fluid emitting axis of the apertures 68 at the central portion of the support surface 60 can be perpendicular to the green body 12.

Returning to FIG. 5, in one example of an air bearing 52, the air bearing 52 includes a support surface 60 that is radially adjustable to accommodate geometrically similar green bodies 12 with different sizes. Relative motion between the hollow support 62 and the bushing 64 allows the support surface 60 to move, such as through rotation, translation, etc. through a continuum of positions. Each position is configured to follow a portion of an outer surface 46 of the green body 12. Each of the positions can create a support area 74 that is concentric with every other support area 74 created by other support surface 60 positions. In one example, the air bearing 52 has a support surface 60 that can be adjusted to a position to freely float and transport a green body 12 having a diameter between +0.4 inches and −0.4 inches from a nominal green body 12 diameter. It is to be appreciated that other ranges of diameters are also contemplated.

In another example of an air bearing 52, the air bearing 52 is adjustable to accommodate a green body 12 having a different geometrical shape. As an example, in one position, the support surface 60 can create a support area 74 of circular cross-section. After an adjustment, the support surface 60 can create a support area 74 of an oval-shaped cross-section.

Returning to FIG. 1, in another embodiment of the apparatus 10, the apparatus 10 comprises an extruding device 14 including a die member 16. The extruding device 14 is configured to extrude a batch of ceramic-forming material through the die member 16 to form a green body 12. A support device 50 includes at least one air bearing 52 with a plurality of apertures 68. At least a quantity of apertures 68 are oriented with a fluid emitting axis 78b extending at an oblique angle with respect to the extrusion axis 22. This fluid emitting axis 78b orientation can be used to urge the green body 12 in a direction parallel to the extrusion axis 22. In one example, the fluid emitting axis 78b extending at an oblique angle with respect to the extrusion axis 22 contributes a force component to the green body 12 in the extrusion direction 23 parallel to the extrusion axis 22 and away from the die member 16. This force component is created by the pressurized fluid emitted from a quantity of the apertures 68 at an oblique angle with respect to an extrusion axis 22 so as to urge the green body 12 to another air bearing 52, further processing equipment, or the like. The apparatus 10 further includes a fluid source 70 configured to be placed in fluid communication with the plurality of apertures 68 to create an air cushion between the support surface 60 and the green body 12.

In yet another embodiment of the apparatus 10, the apparatus 10 comprises an extruding device 14 including a die member 16. The extruding device 14 is configured to extrude a batch of ceramic-forming material through the die member 16 to form a green body 12. A support device 50 includes at least one radially adjustable air bearing 52. The air bearing 52 includes a support surface 60 with a plurality of apertures 68, wherein a position of the support surface 60 relative to the extrusion axis 22 is configured to be adjusted. The support surface 60 can be configured to circumscribe greater than 180° of a support area 74 for the green body 12.

As an illustrative example, the apparatus 10 includes an air bearing 52 that includes a support surface 60 that is adjustable by linear translation through a continuum of positions. Each of the positions can create a support area 74 that is concentric with every other support area 74 created by other support surface 60 positions. In one example, the air bearing 52 has a support surface 60 that can be adjusted to a position to accommodate geometrically similar green bodies 12 with different sizes. The air bearing 52 can freely float and transport a green body 12 having a diameter between +0.4 inches and –0.4 inches from a nominal diameter of the green body 12. It is to be appreciated that other ranges of diameters are also contemplated. Additionally, the apparatus 10 includes a fluid source 70 is configured to be placed in fluid communication with the plurality of apertures 68 to create an air cushion between the support surface 60 and the green body 12.

Returning to FIG. 5, in one example, the apparatus 10 includes at least one adjustable air bearing 52. The at least one adjustable air bearing 52 includes a plurality of air bearings 52 that each include a corresponding support segment 82. Each support segment 82 can include a quantity of the plurality of apertures 68. The plurality of support segments 82 is configured to cooperate to define the support surface 60. The side of the support segment 82 facing the support area 74 can be in the shape of a circular arc. When each support segment 82 has the form of a circular arc profile, the plurality of support segments 82 can, together, form a larger arcuate segment of a circle or other arcuate (e.g., oval) shape. It is to be appreciated that other shapes for the support segments 82 are also contemplated, for example segments of ovals so that when used together, form a support surface 60 with an oval-shaped profile.

The support segments 82 can be configured to be radially adjusted between an extended and retracted position. Relative motion between the hollow support 62 and the bushing 64 allows the support segment 82 to move, such as through rotation, translation, etc. through a continuum of positions. The translation of each support segment 82 follows a radial path from the extended and retracted positions. Each of the positions can create a support area 74 that is concentric with every other support area 74 created by other support segment 82 positions. In one example, the air bearing 52 has support segments 82 that can be adjusted to a position to freely float and transport a green body 12 having a diameter between +0.4 inches and –0.4 inches from a nominal green body 12 diameter. It is to be appreciated that other ranges of diameters are also contemplated.

Figure 6:
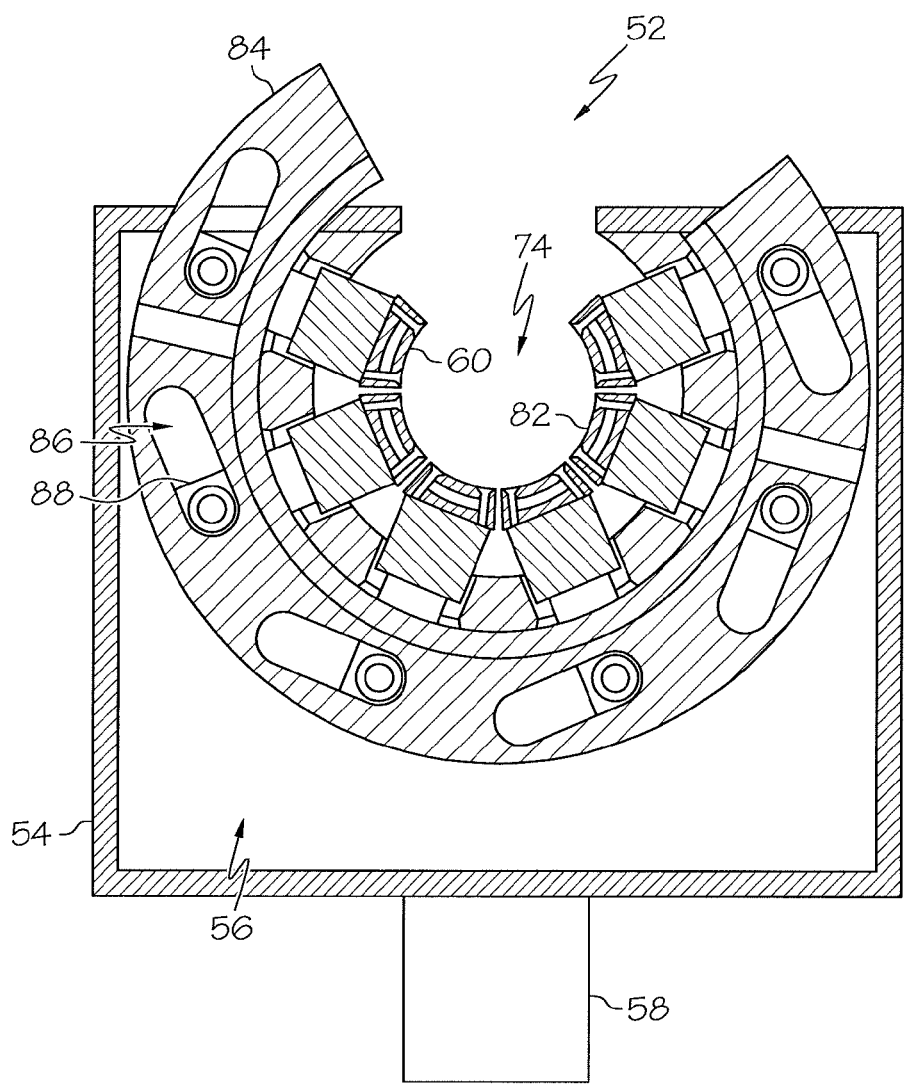
FIG. 6 is a sectional view of an example air bearing along line 6-6 of FIG. 12.

Referring to FIG. 6, the support device 50 can include a diameter adjustment lever 84. The diameter adjustment lever 84 can be arcuate or circular in shape, although other shapes are contemplated. At least one slot 86 is provided in the diameter adjustment lever 84 such that one end of the slot 86 is located at a longer distance from the center of the circular diameter adjustment lever 84. The diameter adjustment lever 84 can be slidably attached to at least one shaft 88 at the slot 86 with a connection such as a pin, roller bearings, or other connection methods. In one example, the at least one shaft 88 can be rigidly connected to a support segment 82.

Because the slot 86 end points are at different radial distances from the center of the diameter adjustment lever 84, circumferential movement of the diameter adjustment lever 84 simultaneously extends or retracts the shafts 88 with respect to the extrusion axis 22. This radial movement of the shaft 88 thus moves the support segments 82 through a continuum of positions resulting in an air bearing support surface 60 with an adjustable diameter, each of the positions being concentric with any of the other positions. Radial movement of the shafts 88 and support segments 82 is guided by the sliding engagement of the hollow support 62 with bushing 64.

Referring to FIG. 12, several air bearings 52a, 52b, 52c, similar or identical to the air bearing 52 discussed above, can be placed in series at the end of the extruding device 14. Green bodies 12 can then leave the extruding device 14 and be floatingly supported and even transported by a series of air bearings 52a, 52b, 52c. In one example, each air bearing 52 can be controlled manually. In another example, each air bearing 52 can be interconnected by a master control system. A peripheral measuring device 102 can be located at the end of the air bearing 52 that serves as an entrance for the green body 12. Peripheral measuring devices 102a, 102b, 102c can be associated with each of the air bearings 52a, 52b, 52c to detect certain production characteristics (e.g., the shape, size, and irregularities of the outer surface 46) of the green body 12 as it enters the respective air bearings 52a, 52b, 52c. Each peripheral measuring device 102a, 102b, 102c can then communicate with the logic unit 104 via electrical connections 106a, 106b, 106c. The logic unit 104 can also be described as a controller.

The logic unit 104 can evaluate the production characteristics of the green body 12 located within each air bearing 52. The logic unit 104 then communicates with actuators 108a, 108b, 108c associated with each diameter adjustment lever 84a, 84b, 84c of each air bearing 52a, 52b, 52c. The logic unit 104 can communicate with each diameter adjustment lever 84a, 84b, 84c via electrical connections 110a, 110b, 110c to adjust the support surface 60 according to the production characteristics of the green body 12. The actuators 108a, 108b, 108c can then be each selectively activated to provide a predetermined move of the respective adjustment lever 84a, 84b, 84c to create a support surface 60 that accurately follows the outer surface 46 of the green body 12. The logic unit 104 can automatically control adjustments of the plurality of support segments 82 in response to a change in surface characteristic of the green body 12 as the green body 12 travels in the extrusion direction 23 based on feedback from the peripheral measuring devices 102a, 102b, 102c. As such, the series of air bearings 52 can accommodate for changes in the shape of the green body 12, e.g., due to shrinkage, etc.

The logic unit 104 can also communicate with a manifold 112 via electrical connection 114. The manifold 112 can comprise a plurality of solenoid valves (not shown), for example, one solenoid valve for each fluid inlet 58 located on the air bearings 52a, 52b, 52c. The solenoid valves can be configured to control the flow of pressurized fluid from the manifold 112 to each fluid inlet 58. In one example, the logic unit 104 can control simultaneous activation of the solenoid valves in substantially the same manner. Alternatively, the logic unit 104 can also control each solenoid valve on an individual basis according to the production characteristics of the green body 12 in each air bearing 52a, 52b, 52c. The logic unit 104 can also independently control each air bearing 52a, 52b, 52c as a unit according to the production characteristics of the green body 12 within the air bearing 52a, 52b, 52c. The manifold 112 and each fluid inlet 58 are in fluid communication via tubing, piping, or any other appropriate means. The logic unit 104 can include a feedback loop.

Methods of producing a green body 12 will now be described. The method includes the step of extruding a batch of ceramic-forming material into a green body 12. Various ceramic-forming batch materials and/or compositions may be used in various examples. The method further includes the step of supporting the green body 12 with an air cushion produced by an air bearing 52 having a support surface 60 circumscribing greater than 180° of the green body 12. Various angles of support surface 60 circumscribing the green body 12 can be used. In one example, the support surface 60 is configured to provide a portion of a cylinder that is less than about 315°. In another example, the support surface 60 circumscribes from about 215° to about 315° of the green body 12. In yet another example, the support surface 60 circumscribes from about 250° to about 280° of the green body 12. In still another example, the support surface 60 circumscribes about 265° of the green body 12.

In another method of producing a green body 12, the method includes the step of extruding a batch of ceramic-forming material into a green body 12 along an extrusion axis 22. The method further includes the step of supporting the green body 12 with an air cushion produced by a plurality of fluid streams. At least a quantity of the fluid streams each apply a transverse force component to an outer surface 46 of the green body 12. In one example, the transverse force component of the emitted fluid is in the direction parallel to the extrusion axis 22 and away from the extruding device 14. The method can also comprise the step of biasing the green body 12 to move in an extrusion direction 23 along the extrusion axis 22 with a plurality of the oblique force components. These force components are created by the pressurized fluid emitted from a quantity of the apertures 68 at an oblique angle with respect to the extrusion axis 22 so as to urge the green body 12 in a direction parallel to the extrusion axis 22.

The method can further comprise the step of biasing the green body 12 to apply a rotational moment force to the green body 12 about the extrusion axis 22 with a plurality of the transverse force components. For instance, a quantity of the fluid streams can each apply a force component to an outer surface 46 of the green body 12 that is transverse with respect to the extrusion axis 22. This transverse force component of the emitted fluid can be in a direction perpendicular to the extrusion axis 22 at a distance away from the extrusion axis 22, thus applying a moment arm about the extrusion axis 22. This force component is created by the pressurized fluid emitted from a quantity of the apertures 68 at a transverse angle with respect to the extrusion axis 22 so as to provide a moment force to the green body 12 that can counteract a tendency of the green body 12 to rotate as it is extruded from the die member 16.

In another method of producing a green body 12, the method comprises the step of extruding a batch of ceramic-forming material into a green body 12 along an extrusion axis 22. The method further comprises the step of radially constricting a plurality of support surfaces 60 of a plurality of adjustable air bearings 52 to follow an outer surface 46 portion of the green body 12. The method further comprises the step of emitting fluid from a plurality of apertures 68 of each of the plurality of support surfaces 60 to create an air cushion between the plurality of support segments 82 and the outer surface 46 portion of the green body 12.

In one example of the method, the step of radially constricting the plurality of support segments 82 is conducted after an end of the green body 12 enters a support area 74 defined by the support surfaces 60. The diameter adjustment lever 84 can be operated to move the support surfaces 60 through a continuum of positions resulting in an air bearing 52 support surface 60 with an adjustable diameter, each of the positions configured to follow an outer surface 46 portion of the green body 12. Constricting the plurality of support segments 82 after an end of the green body 12 enters the support area 74 allows the support area 74 to be accurately positioned to follow an actual diameter of the outer surface 46 portion of the green body 12, not an anticipated diameter. Thus, the constriction can then account for miscalculations of anticipated green body 12 diameters, unexpected water content in the green body 12 resulting in a larger diameter of the green body 12, etc. The constriction can be initiated manually or initiated automatically by a control system associated with the air bearing 52. In one example, the support surface 60 can be at its most dilated position until the green body 12 enters the support area 74. At that time, the support surface 60 can be constricted to meet the production characteristics of the particular green body 12 that is located within the support area 74. As such, the initial retraction of the support segments 82 can avoid inadvertent engagement of the end of the green body 12 with the support segments 82 that might otherwise occur if the support surfaces 60 are extended before the green body 12 enters the support area 74. As such, damage to the end of the green body 12 and interruption of the microstructure of the honeycomb walls 32 of the green body 12 can be avoided.

The method can also comprise the step of automatically adjusting the plurality of support segments 82 in response to a change in surface characteristic of the green body 12. In one example, the surface characteristic can be the outer diameter of the green body 12. As the green body 12 gradually loses moisture content, the outer diameter of the green body 12 can change. In order to accurately follow the outer surface 46 portion of the green body 12, successive air bearings 52 may have to constrict or expand the support area 74.

The described extrusion apparatus 10 and air bearing 52 provide several benefits. One adjustable air bearing 52 may be able to support and transfer various diameters of green bodies 12, thus able to replace several existing models of air bearings 52 that are not adjustable and are configured to support and transfer only a single diameter green body 12. Additionally, a single adjustable air bearing 52 can also support and transfer green bodies 12 with different cross-sectional geometries. Furthermore, the adjustable air bearing 52 can more accurately support a green body 12 through angles greater than 180°, thereby enhancing support of the green body 12 and helping further support the green body 12 during a severing operation. Still further, the more accurate support of the green body 12 through angles greater than 180° can also foster even drying of the green body 12 and reduce surface defects such as fissures that can degrade performance of the finished product. The green body 12 floats on an air cushion provided by pressurized air emitted from apertures 68 in the support surfaces 60. The fluid emitting axis of each aperture 68 can be modified to induce translational motion of the green body 12, rotational bias to the green body 12, or elimination or reduction of undesirable motion of the green body 12.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An apparatus for transporting a cellular structure, the apparatus comprising:
    a support device comprising a plurality of support segments of radially adjustable air bearings each comprising a support surface with a plurality of apertures, wherein the support surfaces circumscribe greater than 180° of a support area for the cellular structure, and wherein the radial adjustment is provided by a radially sliding engagement; and
    a fluid source configured to be placed in fluid communication with the plurality of apertures to create an air cushion between the support surface and the cellular structure so that the cellular structure may freely float within the support area.

2. The apparatus of claim 1, wherein the support surfaces circumscribe from greater than 180° to about 360° of the support area.

3. The apparatus of claim 1, wherein the support surfaces circumscribe from about 215° to about 315° of the support area.

4. The apparatus of claim 1, wherein the support surfaces circumscribe from about 250° to about 280° of the support area.

5. The apparatus of claim 1, wherein the support surfaces circumscribe about 265° of the support area.

6. The apparatus of claim 1, wherein at least a quantity of the apertures are oriented with a fluid emitting axis extending substantially perpendicular to an extrusion axis of the extruding device.

7. The apparatus of claim 1, wherein at least a quantity of the apertures are oriented with a fluid emitting axis extending at an oblique angle with respect to an extrusion axis of the extruding device.

8. The apparatus of claim 1, wherein at least a quantity of the apertures are oriented with a fluid emitting axis extending with a directional component that extends at an oblique angle with respect to an extrusion direction along an extrusion axis of the extruding device.

9. The apparatus of claim 1, wherein at least a quantity of the apertures are oriented with a fluid emitting axis extending with a directional component that extends parallel to an extrusion direction along an extrusion axis of the extruding device.

10. The apparatus of claim 1, wherein the radial adjustment accommodates green bodies of different cross-sections, diameters or profiles.

11. The apparatus of claim 1, wherein the radial adjustment accommodates green bodies having different geometrical shapes.

\* \* \* \* \*